(12) United States Patent
Kim et al.

(10) Patent No.: US 12,337,847 B2
(45) Date of Patent: Jun. 24, 2025

(54) APPARATUS FOR IDENTIFYING SPEED BUMP AND METHOD FOR THE SAME

(71) Applicants: Hyundai Motor Company, Seoul (KR); Kia Corporation, Seoul (KR)

(72) Inventors: Byung Joo Kim, Seoul (KR); Hyung Jin Kim, Seoul (KR); Young Jae Kim, Yongin-si (KR); In Yong Jung, Incheon (KR); Jong Hoon Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 382 days.

(21) Appl. No.: 17/929,859

(22) Filed: Sep. 6, 2022

(65) Prior Publication Data

US 2023/0347900 A1    Nov. 2, 2023

(30) Foreign Application Priority Data

May 2, 2022    (KR) .................. 10-2022-0054404

(51) Int. Cl.
*B60W 40/06*    (2012.01)
(52) U.S. Cl.
CPC .................. *B60W 40/06* (2013.01)
(58) Field of Classification Search
CPC .......... B60W 40/06; B60W 2720/103; B60W 40/076; B60W 2556/10; B60W 2520/10; B60W 2520/105; B60W 2520/16; B60W 2552/35; B60W 2556/50; B60W 2756/10; B60W 10/18; B60W 40/10; G01C 21/3822; G01C 21/3826; G01C 21/3815; G01C 21/3811; G01C 21/3804; G01C 21/3807; G06V 20/588; G06V 20/58; G08G 1/0112; G08G 1/0133; G08G 1/04; E01F 9/529
See application file for complete search history.

(56) References Cited

U.S. PATENT DOCUMENTS 10,406,882 B2 *  9/2019  Lakehal-Ayat .... B60G 17/0182
11,420,633 B2 *  8/2022  Garnault .............. B60W 40/04
(Continued)

FOREIGN PATENT DOCUMENTS

JP    2019-21027 A    2/2019
KR    10-2007-0060774 A    6/2007
(Continued)

OTHER PUBLICATIONS

The evaluation of vehicle interior impact noise inducing by speed bumps based on multi-features combination and support vector machine (Year: 2020).*

(Continued)

*Primary Examiner* — Fadey S. Jabr
*Assistant Examiner* — Faris Asim Shaikh
(74) *Attorney, Agent, or Firm* — Banner & Witcoff, Ltd.

(57) ABSTRACT

An apparatus and a method for identifying a speed bump are provided. The apparatus may include a vehicle network access device to provide an access interface with a vehicle network, and a controller to acquire information on a position of the speed bump placed on a road on which a vehicle travels, collect, from a vehicle network, information on driving of a driver around the speed bump, and determine a type of the speed bump, based on the information on the driving of the driver.

20 Claims, 6 Drawing Sheets

(56) References Cited

U.S. PATENT DOCUMENTS

| | | | |
|---|---|---|---|
| 11,454,510 B1* | 9/2022 | Gray | G07C 5/008 |
| 11,458,972 B2* | 10/2022 | Kim | B60W 10/18 |
| 2008/0243337 A1* | 10/2008 | Tsuda | B60W 50/14 |
| | | | 701/41 |
| 2012/0053805 A1* | 3/2012 | Dantu | B60W 40/09 |
| | | | 701/70 |
| 2014/0163836 A1* | 6/2014 | Um | B60W 30/143 |
| | | | 701/93 |
| 2014/0163837 A1* | 6/2014 | Um | B60W 30/143 |
| | | | 701/93 |
| 2015/0046084 A1* | 2/2015 | Choi | G01C 21/3697 |
| | | | 701/468 |
| 2015/0274105 A1* | 10/2015 | Le Merrier | B60W 30/085 |
| | | | 701/45 |
| 2015/0291177 A1* | 10/2015 | Lee | B60W 40/06 |
| | | | 73/146 |
| 2017/0106855 A1* | 4/2017 | Lavoie | B60W 50/0097 |
| 2017/0246955 A1* | 8/2017 | Richards | B60T 8/86 |
| 2019/0001965 A1* | 1/2019 | Cho | B60W 30/025 |
| 2019/0203435 A1* | 7/2019 | Xiang | E01F 9/571 |
| 2019/0316914 A1* | 10/2019 | Shin | G01C 21/30 |
| 2020/0207356 A1* | 7/2020 | Chandra | G01S 17/89 |
| 2020/0346654 A1* | 11/2020 | Kojo | G08G 1/096888 |
| 2021/0331677 A1* | 10/2021 | Kim | B60W 40/10 |
| 2022/0003552 A1* | 1/2022 | Makke | G01C 21/14 |
| 2022/0363263 A1* | 11/2022 | Chandra | B60W 40/06 |
| 2024/0199056 A1* | 6/2024 | Jeevashanthi Ramasamy, Jr. | |
| | | | G08G 1/052 |

FOREIGN PATENT DOCUMENTS

| | | |
|---|---|---|
| KR | 10-2015-0000016 A | 1/2015 |
| KR | 10-2019-0096309 A | 8/2019 |
| KR | 10-2019-0097486 A | 8/2019 |
| KR | 10-2020-0061083 A | 6/2020 |

OTHER PUBLICATIONS

Advance Driver Assistance System (ADAS)—Speed bump detection (Year: 2016).*

* cited by examiner

APPARATUS FOR IDENTIFYING SPEED BUMP AND METHOD FOR THE SAME

CROSS-REFERENCE TO RELATED APPLICATION

This application claims the benefit of priority to Korean Patent Application No. 10-2022-0054404, filed in the Korean Intellectual Property Office on May 2, 2022, the entire contents of which are incorporated herein by reference.

TECHNICAL FIELD

The present disclosure relates to a technology for identifying the type of a speed bump (e.g., without a camera or a Lidar sensor).

BACKGROUND

In general, a speed bump placed on a road surface is an obstacle to efficiently limit the speed of a vehicle. When the vehicle passes through the speed bump at a specific speed or more, an impact may be applied to the vehicle. Ride discomfort and/or unpleasant user experience may be caused by the speed bump if the vehicle is not capable of detecting the speed bump and/or the type of the speed bump in a timely manner.

SUMMARY

The following summary presents a simplified summary of certain features. The summary is not an extensive overview and is not intended to identify key or critical elements.

Ride comfort may be enhanced if the type of speed bump is accurately and effectively determined by the vehicle. The determined type of the speed bump may be shared with other vehicles (e.g., via a network and to server(s)), and the server(s) may receive such information from a plurality of vehicles. The driver may be informed by the vehicle and/or from the server(s) about the real/actual type of the speed bump, and the driver may be notified, for example, if the driving status is not safe and/or inappropriate in view of the type of the speed bump. A suspension of the vehicle may operate based on the determined type of the speed bump and/or the real/actual type of the speed bump. The driving habit may be improved in an area including one or more speed bumps, and the driving safety and ride comfort may be improved.

A suspension of the vehicle may be mounted to be coupled to an axle to perform a control operation to prevent a vibration or an impact, which is applied from the road surface during the driving, from being directly applied to a vehicle body, such that damage to a vehicle body, an occupant, or a freight is prevented and a safety accident is reduced and/or prevented. Accordingly, the ride comfort of the vehicle may be improved.

The suspension may include a chassis spring to mitigate the impact from the road surface, a shock absorber to control the free vibration of the chassis spring to improve the ride comfort, and a stabilizer bar to prevent the rolling of the vehicle.

A vehicle equipped with an electronic controlled suspension (ECS) may automatically adjust the strength of the suspension, depending on the traveling situation of the vehicle or the road surface.

The ECS may detect, through various types of sensors, information on a traveling state, such as a vehicle speed, a steering angle, and the up and down acceleration of the vehicle body, and information on the road surface, and may electronically and automatically control the spring constant of the suspension, the damping force of the shock absorber, the posture of the vehicle body, and the height of the vehicle to be matched with the state of the road surface.

The ECS be classified into an active suspension which may control the movement of the vehicle body by applying external energy to the suspension using an actuator, and a semi-active suspension which may regulate the damping force by using the actuator as an auxiliary spring.

In some technical implementations of identifying a speed bump on a road surface, the type of the speed bump may be identified based on the data acquired through a camera or a Lidar sensor. In such implementations, the camera and the Lidar sensor are additionally required for identifying the type of the speed bump.

An apparatus may comprise: a network access device configured to communicate with a network (e.g., a vehicle network); and a controller. The controller may be configured to: acquire information associated with a position of a speed bump positioned in an area associated with a vehicle; collect, from the network, driving information associated with driving of a driver of the vehicle around the speed bump; and determine, based on the driving information, a type of the speed bump.

The driving information may be associated with a distance between a reference point and a position of the speed bump, and the driving information may comprise at least one of: vehicle speed information; braking information; or acceleration information.

The controller may be configured to: collect a pitch rate generated while the vehicle is passing over the speed bump; and detect, based on a plurality of peaks of the pitch rate, a real type of the speed bump.

The controller may be configured to adjust, based on the determined type of the speed bump being different from the real type of the speed bump, one or more reference values for determining the type of the speed bump.

The controller may be configured to: detect the real type of the speed bump as a first type of speed bump based on a first peak of the plurality of peaks exceeding a first reference value and a second peak of the plurality of peaks not exceeding a second reference value; detect the real type of the speed bump as a second type of speed bump based on the first peak exceeding the first reference value and the second peak exceeding the second reference value; and detect the real type of the speed bump as a third type of speed bump based on the first peak not exceeding the first reference value and the second peak not exceeding the second reference value.

The controller may be configured to determine the type of the speed bump at a reference point at which a distance to the speed bump is a preset distance.

The controller may be configured to: determine the type of the speed bump as a first type of speed bump based on a vehicle speed of the vehicle being less than a first reference speed at the reference point; determine the type of the speed bump as a second type of speed bump based on the vehicle speed exceeding the first reference speed and being less than a second reference speed at the reference point; and determine the type of the speed bump as a third type of speed bump based on the vehicle speed exceeding the second reference speed and being less than a third reference speed at the reference point.

The controller may be configured to redetermine the type of the speed bump based on braking of the vehicle occurring after the vehicle passes through the reference point and before the vehicle reaches the speed bump.

The controller may be configured to: determine the type of the speed bump as a third type of speed bump based on a brake amount being equal to or less than a preset brake amount; determine the type of the speed bump as a first type of speed bump based on the brake amount exceeding the preset brake amount and a braking point being a first braking point; and determine the type of the speed bump as a second type of speed bump based on the brake amount exceeding the preset brake amount and the braking point being a second braking point.

The controller may be configured to determine the type of the speed bump at a time point in which the vehicle reaches the speed bump.

The controller may be configured to: determine the type of the speed bump as a first type of speed bump based on a vehicle speed of the vehicle being less than a first reference speed at the time point at which the vehicle reaches the speed bump; determine the type of the speed bump as a second type of speed bump based on the vehicle speed exceeding the first reference speed and being less than a second reference speed at the time point at which the vehicle reaches the speed bump; and determine the type of the speed bump as a third type of speed bump based on the vehicle speed exceeding the second reference speed and being less than a third reference speed at the time point at which the vehicle reaches the speed bump.

The controller may be configured to determine the type of the speed bump based on an acceleration time point at which the vehicle is accelerated.

The controller may be configured to: determine the type of the speed bump as a first type of speed bump based on the acceleration time point being a time point before a rear wheel of the vehicle passing over the speed bump; determine the type of the speed bump as a second type of speed bump based on the acceleration time point being a time point after the rear wheel of the vehicle passing over the speed bump; and determine the type of the speed bump as a third type of speed bump based on the acceleration time point being a time point after a front wheel of the vehicle passing over the speed bump.

A method performed by the apparatus may comprise: receiving, by a controller, information associated with a position of a speed bump positioned in an area associated with a vehicle; collecting, by the controller and from a network (e.g., a vehicle network), driving information associated with driving of a driver of the vehicle around the speed bump; and determining, by the controller and based on the driving information, a type of the speed bump. The apparatus may perform one or more operations further described herein.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some examples of the present disclosure will be described in detail with reference to the accompanying drawings. In adding the reference numerals to the components of each drawing, it should be noted that the identical or equivalent component is designated by the identical numeral even when they are displayed on other drawings. Further, in describing the embodiment(s) of the present disclosure, a detailed description of well-known features or functions will be ruled out in order not to unnecessarily obscure the gist of the present disclosure.

In addition, in the following description of components, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
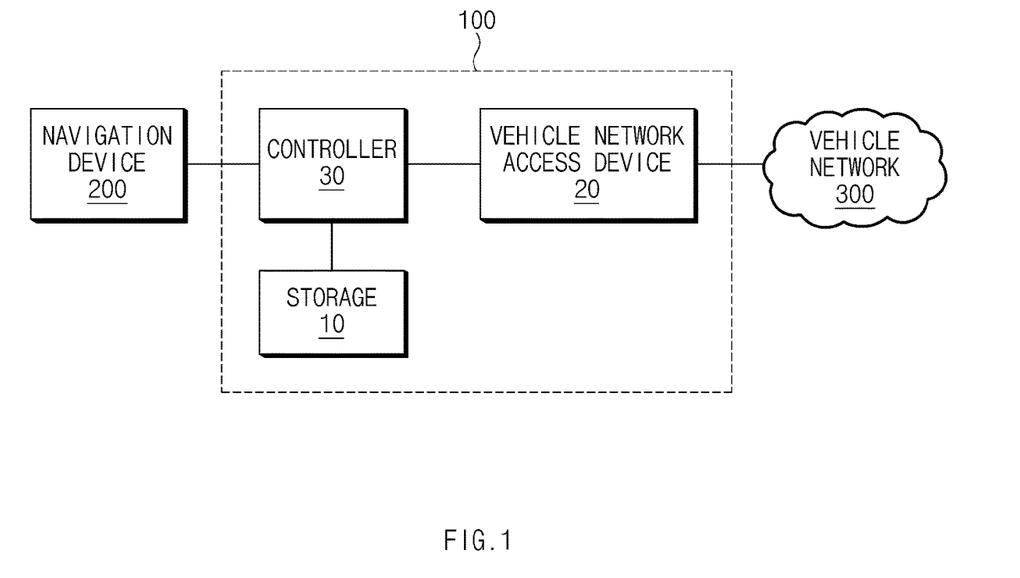
FIG. 1 is a view illustrating a configuration of identifying a speed bump.

FIG. 1 is a view illustrating a configuration of identifying a speed bump.

As illustrated in FIG. 1, an apparatus 100 for identifying a speed bump may include a storage 10, a vehicle network access device 20 (e.g., a transceiver, a network interface, a communication device, a modem, a wireless transceiver, a wired communication interface, a wireless communication interface, etc.), and a controller 30 (e.g., including one or more processors and/or memory). In this case, components may be combined into each other to be implemented in one form (e.g., one hardware component), or some components may be omitted, depending on manners of reproducing the apparatus 100 for identifying the speed bump.

Regarding the components, the storage 10 may store various logics, various algorithms, and various programs required in a process of acquiring information on a position of a speed bump placed on a road on which a vehicle travels, a process of collecting information on the driving of the driver around the speed bump, and a process of determining the type of the speed bump, based on the information on the driving of the driver. The information on the driving of the driver may include vehicle speed information, braking information, or acceleration information based on the distance to the speed bump.

Figure 2:
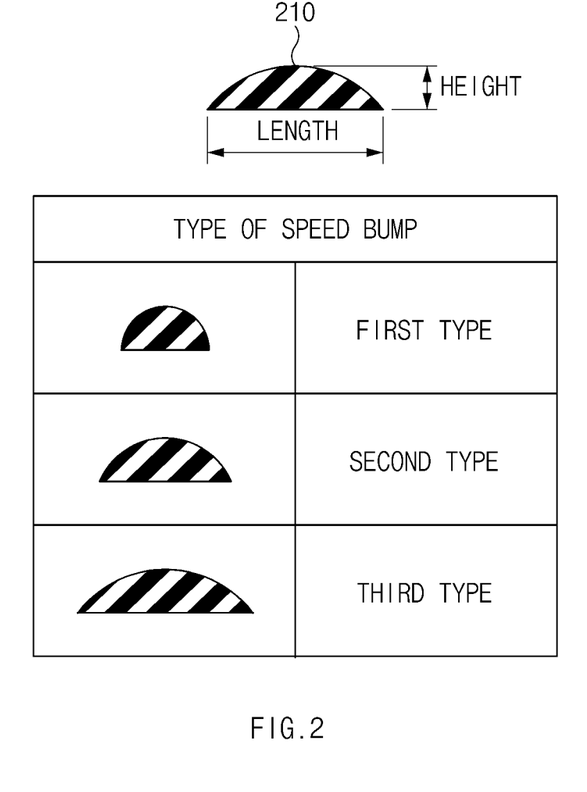
FIG. 2 is a view illustrating the type of a speed bump.

The storage 10 may store information on the type of various speed bumps 210, for example, as illustrated in FIG. 2.

FIG. 2 is a view illustrating the type of a speed bump.

For example, as illustrated in FIG. 2, a first speed bump type may be a speed bump having a first height (e.g., a height of 7.5 cm) and a first length (e.g., a length of 1 m), a second speed bump type may be a speed bump having a second height (e.g., a height of 7.5 cm) and a second length (e.g., a length of 2 m), and a third speed bump type may be a speed bump having a third height (e.g., a height of 10 cm) and a third length (e.g., a length of 3.6 m). Although the present disclosure uses the term "speed bump," it may be appreciated that various types of speed breakers, such as speed humps, speed bumps, wheel stops, etc., may be referred to as speed bump(s).

The storage 10 may store various types of threshold values required to determine the type of the speed bump, based on the information on the driving of the driver. The various types of threshold values may be changed under the control of the controller 30.

For example, the storage 10 may store information on a first point (hereinafter, a reference point) where the distance between the vehicle and the speed bump corresponds to a first distance (for example, a preset distance of 10 m), information on a second point (for example, a first braking point) where the distance between the vehicle and the speed bump corresponds to a second distance (for example, a preset distance of 3 m), and information on a third point (for example, a second braking point) where the distance between the vehicle and the speed bump corresponds to a third distance (for example, a preset distance of 7 m), In this case, the first braking point may be used to determine the type of the speed bump (e.g., located in front of the vehicle) as the first type of speed bump, and the second braking point may be used to determine the type of the speed bump (e.g., located in front of the vehicle) as the second type of speed bump.

The storage 10 may store a first reference speed (for example, 30 kph), which may be used to determine the type of the speed bump as a first type of speed bump at the reference point, a second reference speed (for example, 40 kph), which may be used to determine the type of the speed bump as a second type of speed bump at the reference point, and a third reference speed (for example, 50 kph) which may be used to determine the type of the speed bump as a third type of speed bump at the reference point. The first reference speed, the second reference speed, and the third reference speed may be used as reference values to determine the type of the speed bump at the reference point.

In another example, the storage 10 may store a first reference speed (for example, 20 kph), which may be used to determine the type of the speed bump as the first type of speed bump at the reference point, a second reference speed (for example, kph), which may be used to determine the type of the speed bump as the second type of speed bump at the reference point, and a third reference speed (for example, 40 kph), which may be used to determine the type of the speed bump as the third type of speed bump at the reference point. The first reference speed, the second reference speed, and the third reference speed may be used as reference values to determine the type of the speed bump at a time point (hereinafter, an entering time point) at which the vehicle enters into an area including the speed bump.

The storage 10 may store a reference braking amount (for example, 15%) used in the process of determining the type of the speed bump, based on braking occurring after the vehicle passes through the reference point. In this case, the reference braking amount may be a value of a brake pedal sensor (BPS).

For example, the storage 10 may store various types of threshold values, based on one or more parameters (e.g., example values included in Table 1). The one or more parameters may be one or more mobility parameters associated with the vehicle.

TABLE 1

| | | Speed Bump | | |
|---|---|---|---|---|
| | | First type | Second type | Third type |
| Vehicle speed | Reference point | 30 | 40 | 50 |
| | Entering time point | 20 | 30 | 40 |
| Braking | Braking amount | 15% or more | 15% or more | Less than 15% |
| | Braking point | 3 m | 7 m | |
| Acceleration | Acceleration time point | Before rear wheel escaping | After rear wheel escaping | After front wheel escaping |

The storage 10 may store the information (driving data) on the driving of the driver around the speed bump, and may sequentially delete the past data (e.g., if the quantity of stored values reaches the maximum number of times for storing the information). In this case, the stored format of the driving data may be, for example, as presented in Table 2.

TABLE 2

| Number of times of passing high-speed | Driving data | | | | |
|---|---|---|---|---|---|
| speed bump | [0] | [1] | ... | [N − 1] | [N] |
| N times | A0 | A1 | ... | AN − 1 | AN |
| (N + 1) times | A1 | A2 | ... | AN | AN + 1 |

The storage 10 may include at least one storage medium of a memory, for example, a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and/or an optical disk-type memory.

The vehicle network access device 20 may include a module to provide an access interface with a vehicle network. The vehicle network access device 20 may allow the controller 30 to collect the information on the driving of the driver from the vehicle network. The vehicle network may include at least one type of network elements including, for example, Controller Area Network (CAN), Controller Area Network with Flexible Data-rate (CAN FD), Local Interconnect Network (LIN), FlexRay, Media Oriented Systems Transport (MOST), or Ethernet.

The controller 30 may perform the overall control such that the components normally perform the respective functions. The controller 30 may be implemented in the form of hardware or software, and may be implemented in the form of the combination of the hardware and the software. The controller 30 may be implemented with a micro-processor, but the present disclosure is not limited thereto.

The controller 30 may perform various control operations in the process of acquiring information on a position of a speed bump placed on a road on which a vehicle travels, the process of collecting information on the driving of the vehicle around the speed bump, and the process of determining the type of the speed bump, based on the information on the driving of the driver.

The controller 30 may acquire, from a navigation device 200, the information on the position of the speed bump placed on the road on which the vehicle travels, as well as the present position of the vehicle. The navigation device 200 may acquire the information on the position of the vehicle. The navigation device 200 may be mounted in the vehicle and have a global positioning system (GPS) receiver. The navigation device 200 may acquire the information on the position of the speed bump on the road on which the vehicle travels. The navigation device 200 may store and/or may receive a detailed map.

The controller 30 may collect the information on the driving of the driver around the speed bump, from the vehicle network 300, via the vehicle network access device 20.

The controller 30 may determine the type of the speed bump, based on the information on the driving of the driver.

Hereinafter, the process of determining the type of the speed bump by the controller 30 will be described in more detail, with reference to Table 1.

The controller 30 may (e.g., primarily and/or initially) determine the type of the speed bump at the reference point. The controller 30 may determine the type of the speed bump as the first type of speed bump, for example, if the vehicle speed is less than the first reference speed (for example, 30 kph) at the reference point. The controller 30 may determine the type of the speed bump as the second type of speed bump, for example, if the vehicle speed exceeds the first reference speed and less than the second reference speed (for example, 40 kph) at the reference point. The controller 30 may determine the type of the speed bump as the third type of speed bump, for example, if the vehicle speed exceeds the second reference speed and less than the third reference speed (for example, 50 kph) at the reference point. The controller 30 may determine the type of the speed bump as the third type of speed bump, for example, even if the vehicle speed is equal to or greater than the third reference speed, or may determine the type as or a fourth type of speed bump.

The controller 30 may (e.g., additionally) determine the type of the speed bump, for example, if braking occurs in the vehicle, for example, before the entering time point after the vehicle passes through the reference point. The controller 30 may determine the type of the speed bump as the third type of speed bump, for example, if the braking amount is equal to or less than the reference braking amount (for example, 15%). The controller may determine the type of the speed bump as the first type of speed bump, for example, if the braking amount exceeds the reference braking amount, and if the braking point is the first braking point (for example, 3 m). The controller 30 may determine the type of the speed bump as the second type of a speed bump, for example, if the braking amount exceeds the reference braking amount, and if the braking point is the second braking point (for example, 7 m).

The controller 30 may (e.g., secondarily) determine the type of the speed bump at the entering time point. The controller may determine the type of the speed bump as the first type of speed bump, for example, if the vehicle speed is less than the first reference speed (for example 20 kph) at the entering time point. The controller 30 may determine the type of the speed bump as the second type of speed bump, for example, if the vehicle speed exceeds the first reference speed and less than the second reference speed (for example 30 kph) at the entering time point. The controller 30 may determine the type of the speed bump as the third type of speed bump, for example, if the vehicle speed exceeds the second reference speed and less than the third reference speed (for example, 40 kph) at the entering time point. The controller 30 may determine the type of the speed bump as the third type of speed bump, for example, even if the vehicle speed is equal to or greater than the third reference speed, or may determine the type as a fourth type of speed bump.

The controller 30 may (e.g., finally) determine the type of the speed bump, for example, based on a time point (e.g., an acceleration time point) at which the vehicle is accelerated. The controller 30 may determine the type of the speed bump as the first type of speed bump, for example, if the acceleration time point is a point before a rear wheel escaping (e.g., the acceleration occurs before the rear wheel passes over the speed bump). The controller 30 may determine the type of the speed bump as the second type of the speed bump, for example, if the acceleration time point is a point after the rear wheel escaping (e.g., the acceleration occurs after the rear wheel passes over the speed bump). The controller 30 may determine the type of the speed bump as the third type of speed bump, for example, if the acceleration time point is a point after a front wheel escaping (e.g., the acceleration occurs after the front wheel passes over the speed bump). "Before a rear wheel escaping" may refer to "before a rear wheel of the vehicle passes over the speed bump", and "after the rear wheel escaping" may refer to "after the rear wheel of the vehicle passes over the speed bump".

The controller 30 may determine whether to change various types of threshold values required in the process of determining the type of the speed bump.

Hereinafter, the process of determining whether to change various types of threshold values by the controller 30 will be described in more detail with reference to FIG. 3.

Figure 3:
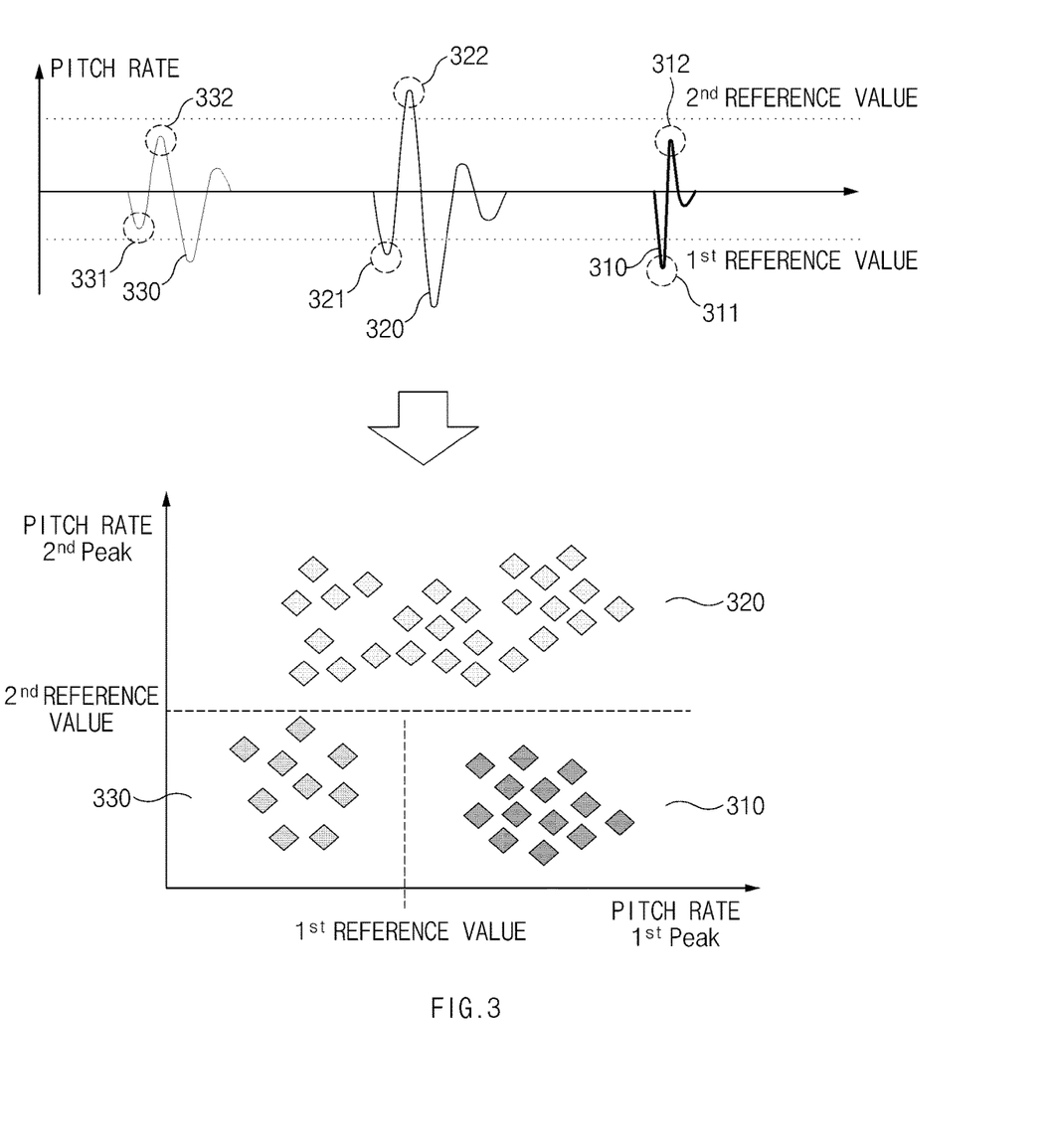
FIG. 3 is a view illustrating a process of determining whether to change a threshold value by a controller provided in an apparatus for identifying a speed bump.

FIG. 3 is a view illustrating the process of determining whether to change the threshold value by the controller provided in the apparatus for identifying the speed bump.

As illustrated in FIG. 3, the controller 30 may collect, from the vehicle network, a pitch rate generated while the vehicle is passing over the speed bump, and a first peak and a second peak of the collected pitch rate may serve as important factors of identifying the real/actual type of the speed bump.

As illustrated as reference numeral '310', the first peak 311 of the pitch rate exceeds the first reference value, but the second peak 312 of the pitch rate does not exceed the second reference value. The above characteristic of the first peak 311 and the second peak 312 may be the characteristic of the first type of speed bump, and reference numeral '310' may indicate the first type of speed bump.

As illustrated as reference numeral '320', the first peak 321 of the pitch rate exceeds the first reference value, and the second peak 322 of the pitch rate exceeds the second reference value. The above characteristic of the first peak 321 and the second peak 322 may be the characteristic of the second type of speed bump, and reference numeral '320' may indicate the second type of speed bump.

As illustrated as reference numeral '330', the first peak 331 of the pitch rate does not exceed the first reference value, and the second peak 332 of the pitch rate does not exceed the second reference value. The above characteristic of the first peak 331 and the second peak 332 may be the characteristic of the third type of speed bump, and reference numeral '330' may indicate the third type of speed bump.

The controller 30 may determine the real/actual type of the speed bump, for example, based on the first peak and the second peak of the pitch rate, after passing over the speed bump.

If the type of the speed bump, which is determined based on the information on the driving of the driver, is different from the real/actual type of the speed bump, the controller 30 may change various types of threshold values, such that the speed bump is determined to be the type same as the real/actual type.

For example, although the type of the speed bump, which is determined (e.g., finally) based on the information on the driving of the driver, is the first type of speed bump but the type of the speed bump is actually the second type of speed bump, the controller 30 may change various types of threshold values such that the type of the speed bump is determined to be the second type of speed bump, instead of the first type of speed bump. The real/actual type of the speed bump may be identified by various methods other than method described above. For example, information of the real/actual type of the speed bump may be received from a server (not shown) via a network (e.g., the vehicle network 300).

Figure 4:
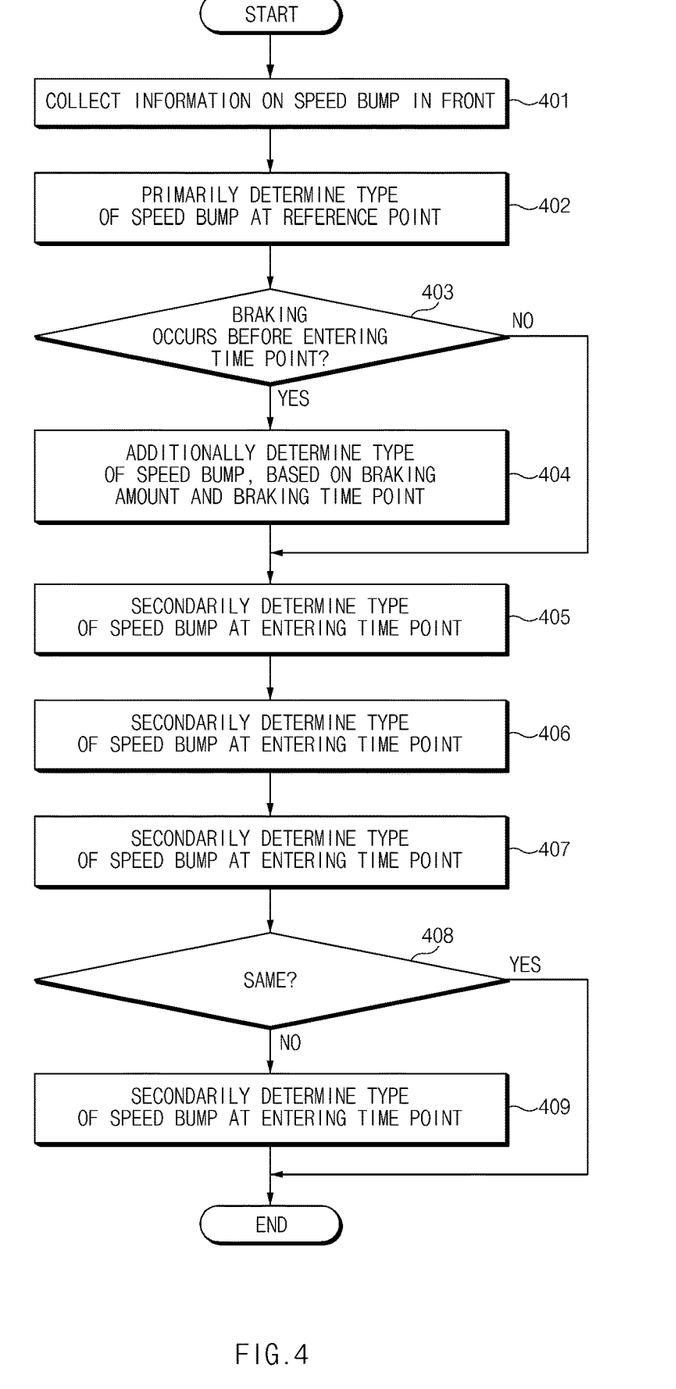
FIG. 4 is a view illustrating the operation of a controller provided in an apparatus for identifying a speed bump.

FIG. 4 is a flowchart illustrating an operation of a controller provided in an apparatus for identifying a speed bump.

The controller 30 may collect the information on a speed bump positioned/located in front of a vehicle (401). The information on the speed bump may include the position of the speed bump and the distance to the vehicle from the speed bump.

The controller 30 may (e.g., primarily and/or initially) determine the type of the speed bump at the reference point (402).

The controller 30 may (e.g., additionally) determine the type of the speed bump, for example, based on the brake amount and the braking time point (404), if the braking occurs before the entering time point (403). The braking time point may include a time point at which the distance between the vehicle and the speed bump reaches a specific distance (for example, a preset distance of 3 m, 7 m, or any other distance).

The controller 30 may (e.g., secondarily) determine the type of the speed bump at the entering time point (405).

The controller 30 may (e.g., finally) determine the type of the speed bump based on the acceleration time point (406).

The controller 30 may detect the real/actual type of the speed bump, for example, based on the pitch rate(s) acquired after passing over the speed bump (407).

The controller 30 may change a threshold value such that the speed bump is determined to be the real/actual type (409), for example, if the type of the speed bump determined does not correspond to the real/actual type of the speed bump (408).

Figure 5:
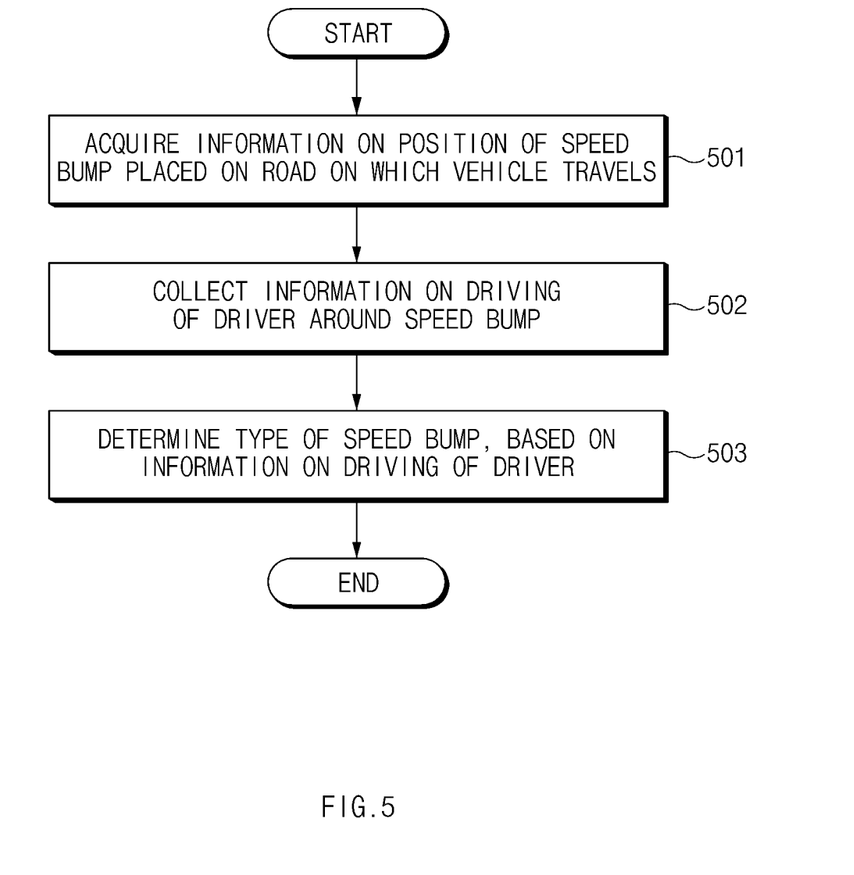
FIG. 5 is a flowchart illustrating a method for identifying a speed bump.

FIG. 5 is a flowchart illustrating a method for identifying the speed bump.

The controller 30 may acquire (e.g., from the navigation device 200) the information on the position of the speed bump placed on the road the vehicle is about to pass over (501).

The controller 30 may collect the information on the driving of the driver around the speed bump (e.g., receive the information from the vehicle network 300) (502).

The controller 30 may determine the type of the speed bump, for example, based on the information on the driving of the driver (503).

An aspect of the present disclosure provides an apparatus and a method for identifying a speed bump, capable of acquiring information on the position of the speed bump placed on the road on which a vehicle travels, of collecting information on the driving of the driver around the speed bump, and of determining the type of the speed bump, based on the information on the driving of the driver, thereby detecting the type of the speed bump with higher accuracy, even though a camera or a Lidar sensor is not equipped.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for identifying a speed bump may include a vehicle network access device to provide an access interface with a vehicle network, and a controller to acquire information on a position of the speed bump placed on a road on which a vehicle travels, to collect, from a vehicle network, information on driving of a driver around the speed bump, and to determine the type of the speed bump, based on the information on the driving of the driver The information on the driving of the driver may include at least one of vehicle speed information, braking information, or acceleration information based on the distance to the speed bump.

The controller may collect a pitch rate generated while the vehicle is passing through the speed bump, and detect a real type of the speed bump, based on the first peak and the second peak of the pitch rate.

The controller may change reference values for determining the type of the speed bump, when the determined type of the speed bump is different from the real type of the speed bump.

The controller may detect the type of the speed bump as the first type of a speed bump, when a first peak of a pitch rate exceeds a first reference value, but the second peak of the pitch rate does not exceed a second reference value, may detect the type of the speed bump as the second type of a speed bump, when the first peak of the pitch rate exceeds a first reference value, but the second peak of the pitch rate exceeds the second reference value, and may detect the type of the speed bump as the third type of a speed bump, when the first peak of the pitch rate does not exceed the first reference value, and the second peak of the pitch rate does not exceed the second reference value.

The controller may determine the type of the speed bump at a reference point at which a distance to the speed bump is a preset distance.

The controller may determine the type of the speed bump to the first type of the speed bump, when the vehicle speed is less than a first reference speed at a reference point, may determine the type of the speed bump to the second type of the speed bump, when the vehicle speed exceeds the first reference speed and less than a second reference speed at the reference point, and may determine the type of the speed bump to the third type of the speed bump, when the vehicle speed exceeds the second reference speed and less than a third reference speed at the reference point The controller may determine the type of the speed bump again, when braking occurs in the vehicle after the vehicle passes through the reference point and before the vehicle enters the speed bump.

The controller may determine the type of the speed bump to the third type of the speed bump, when a braking amount is equal to or less than a preset braking amount, may determine the type of the speed bump to the first type of the speed bump, when the braking amount exceeds the preset braking amount, and when the braking point is the first braking point, and may determine the type of the speed bump to the second type of a speed bump, when the braking amount exceeds the preset braking amount, and when the braking point is the second braking point.

The controller may determine the type of the speed bump, at a time point in which the vehicle enters the speed bump.

The controller may determine the type of the speed bump to the first type of a speed bump, when the vehicle speed is less than the first reference speed at a time point at which the vehicle enters the speed bump, may determine the type of the speed bump to the second type of a speed bump, when the vehicle speed exceeds the first reference speed and less than the second reference speed at the time point at which the vehicle enters the speed bump, and may determine the type of the speed bump to the third type of a speed bump, when the vehicle speed exceeds the second reference speed and less than the third reference speed at the time point at which the vehicle enters the speed bump.

The controller may determine the type of the speed bump based on an acceleration time point at which the vehicle is accelerated.

The controller may determine the type of the speed bump to the first type of the speed bump, when the acceleration time point is before a rear wheel escaping, may determine the type of the speed bump as the second type of the speed bump when the acceleration time point is after the rear wheel escaping, and may determine the type of the speed bump to the third type of the speed bump after a front wheel escaping.

A method for identifying a speed bump may include acquiring, by the controller, information on a position of the speed bump placed on a road on which a vehicle travels from a navigation device, collecting, by the controller, from a vehicle network, information on driving of a driver around the speed bump, and determining, by the controller, the type of the speed bump, based on the information on the driving of the driver The method may further include collecting, by the controller, a pitch rate generated while the vehicle is passing through the speed bump, detecting, by the controller, a real type of the speed bump, based on the first peak and the second peak of the pitch rate, and changing, by the controller, a reference value for determining the type of the speed bump, when the determined type of the speed bump is different to the real type of the speed bump.

The detecting of the real type of the speed bump may include detecting the type of the speed bump as the first type of a speed bump, when a first peak of a pitch rate exceeds a first reference value, but the second peak of the pitch rate does not exceed a second reference value, detecting the type of the speed bump as the second type of a speed bump, when the first peak of the pitch rate exceeds a first reference value, and the second peak of the pitch rate exceeds the second reference value, and detecting the type of the speed bump as the third type of a speed bump, when the first peak of the pitch rate does not exceed the first reference value, and the second peak of the pitch rate does not exceed the second reference value.

The determining of the type of the speed bump may include primarily determining the type of the speed bump at a reference point at which a distance to the speed bump is a preset distance, secondarily determining the type of the speed bump at a time point in which the vehicle enters the speed bump, and finally determining the type of the speed bump, based on acceleration time point at which the vehicle is accelerated.

The determining of the type of the speed bump may further include additionally determining the type of the speed bump, when braking occurs in the vehicle, before the vehicle enters the speed bump after passing through the reference point.

The additionally determining of the type of the speed bump may include determining the type of the speed bump to a third type of a speed bump, when a braking amount is equal to or less than a preset braking amount, determining the type of the speed bump to a first type of a speed bump, when the braking amount exceeds the preset braking amount, and when a braking point is a first braking point, and determining the type of the speed bump to a second type of a speed bump, when the braking amount exceeds the preset braking amount, and when the braking point is a second braking point.

Figure 6:
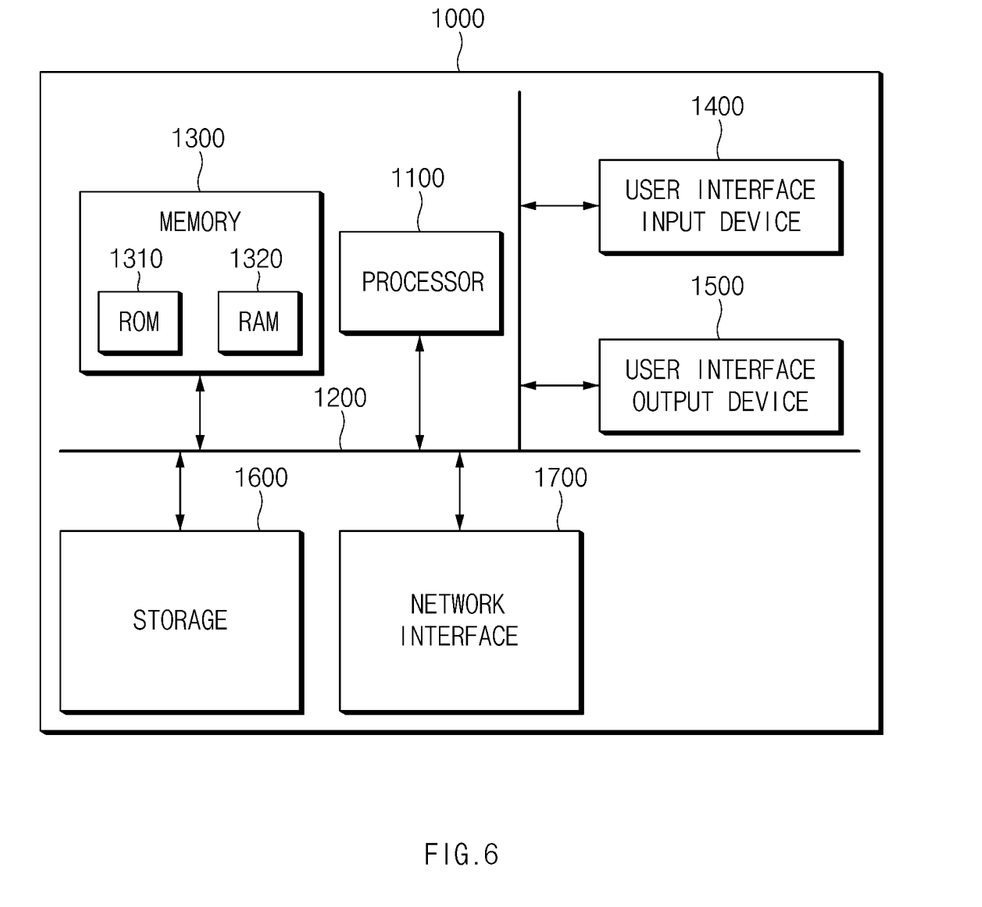
FIG. 6 is a block diagram illustrating a computing system to execute a method for identifying a speed bump.

FIG. 6 is a block diagram illustrating a computing system to execute the method for identifying the speed bump.

Referring to FIG. 6, the method for identifying the speed bump may be implemented and performed by a computing system. A computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

The operations of the methods or algorithms described in connection with the embodiment(s) disclosed in the present disclosure may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, in the apparatus and the method for identifying the speed bump, the information on the position of the speed bump placed on the road on which the vehicle travels may be acquired, the information on the driving of the driver around the speed bump may be collected, and the type of the speed bump may be determined based on the information on the driving of the driver, thereby detecting the type of the speed bump with higher accuracy, even though the camera or the Lidar sensor is not equipped.

The above description is merely an example of the technical idea of the present disclosure, and various modifications and modifications may be made by one skilled in the art without departing from the essential characteristic of the invention.

Accordingly, embodiment(s) of the present disclosure are intended not to limit but to explain the technical idea of the present disclosure, and the scope and spirit of the invention is not limited by the above embodiments. The scope of protection of the present disclosure should be construed by the attached claims, and all equivalents thereof should be construed as being included within the scope of the present disclosure.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:
a memory storing at least one instruction; and
a controller configured to execute the at least one instruction and cause the apparatus to:
acquire information associated with a position of a speed bump positioned in an area associated with a vehicle;
collect, from a vehicle network, driving information associated with driving of a driver of the vehicle around the speed bump;
determine, based on the driving information, a type of the speed bump;
adjust, based on the determined type of the speed bump being different from a real type of the speed bump, one or more reference values for determining the type of the speed bump; and
control, based on the real type of the speed bump, the vehicle to adjust a driving operation, of the vehicle, associated with the speed bump.

2. The apparatus of claim 1, wherein the driving information is associated with a distance between the vehicle and a position of the speed bump, and
wherein the driving information comprises at least one of vehicle speed information, braking information, or acceleration information, or any combination thereof.

3. The apparatus of claim 1, wherein the controller is configured to:
collect a pitch rate generated while the vehicle is passing over the speed bump; and
detect, based on a plurality of peaks of the pitch rate, the real type of the speed bump.

4. The apparatus of claim 3, wherein the controller is configured to:
detect the real type of the speed bump as a first type of speed bump based on a first peak of the plurality of peaks exceeding a first reference value and a second peak of the plurality of peaks not exceeding a second reference value;
detect the real type of the speed bump as a second type of speed bump based on the first peak exceeding the first reference value and the second peak exceeding the second reference value; and
detect the real type of the speed bump as a third type of speed bump based on the first peak not exceeding the first reference value and the second peak not exceeding the second reference value.

5. The apparatus of claim 1, wherein the controller is configured to:
determine the type of the speed bump at a reference point at which a distance to the speed bump is a preset distance.

6. The apparatus of claim 5, wherein the controller is configured to:
determine the type of the speed bump as a first type of speed bump based on a vehicle speed of the vehicle being less than a first reference speed at the reference point;
determine the type of the speed bump as a second type of speed bump based on the vehicle speed exceeding the first reference speed and being less than a second reference speed at the reference point; and
determine the type of the speed bump as a third type of speed bump based on the vehicle speed exceeding the second reference speed and being less than a third reference speed at the reference point.

7. The apparatus of claim 5, wherein the controller is configured to:
redetermine the type of the speed bump based on braking of the vehicle occurring after the vehicle passes through the reference point and before the vehicle reaches the speed bump.

8. The apparatus of claim 7, wherein the controller is configured to:
determine the type of the speed bump as a third type of speed bump based on a brake amount being equal to or less than a preset brake amount;
determine the type of the speed bump as a first type of speed bump based on the brake amount exceeding the preset brake amount and a braking point being a first braking point; and
determine the type of the speed bump as a second type of speed bump based on the brake amount exceeding the preset brake amount and the braking point being a second braking point.

9. The apparatus of claim 1, wherein the controller is configured to:
determine the type of the speed bump at a time point in which the vehicle reaches the speed bump.

10. The apparatus of claim 9, wherein the controller is configured to:
determine the type of the speed bump as a first type of speed bump based on a vehicle speed of the vehicle being less than a first reference speed at the time point at which the vehicle reaches the speed bump;
determine the type of the speed bump as a second type of speed bump based on the vehicle speed exceeding the first reference speed and being less than a second reference speed at the time point at which the vehicle reaches the speed bump; and
determine the type of the speed bump as a third type of speed bump based on the vehicle speed exceeding the second reference speed and being less than a third reference speed at the time point at which the vehicle reaches the speed bump.

11. The apparatus of claim 1, wherein the controller is configured to:
determine the type of the speed bump based on an acceleration time point at which the vehicle is accelerated.

12. The apparatus of claim 11, wherein the controller is configured to:
determine the type of the speed bump as a first type of speed bump based on the acceleration time point being a time point before a rear wheel of the vehicle passing over the speed bump;

determine the type of the speed bump as a second type of speed bump based on the acceleration time point being a time point after the rear wheel of the vehicle passing over the speed bump; and determine the type of the speed bump as a third type of speed bump based on the acceleration time point being a time point after a front wheel of the vehicle passing over the speed bump.

13. The apparatus of claim 1, wherein the controller is configured to:

control the vehicle to adjust the driving operation associated with the speed bump by causing an electronically controlled suspension (ECS) to automatically control a suspension operation associated with the speed bump.

14. The apparatus of claim 1, wherein the one or more reference values are associated with one or more peaks of a pitch rate associated with the speed bump.

15. A method comprising:

receiving, by a controller, information associated with a position of a speed bump positioned in an area associated with a vehicle;

collecting, by the controller and from a vehicle network, driving information associated with driving of a driver of the vehicle around the speed bump; and determining, by the controller and based on the driving information, a type of the speed bump;

collecting, by the controller, a pitch rate generated while the vehicle is passing over the speed bump;

detecting, by the controller and based on a plurality of peaks of the pitch rate, a real type of the speed bump;

adjusting, by the controller and based on the determined type of the speed bump being different from the real type of the speed bump, one or more reference values for determining the type of the speed bump; and controlling, based on the real type of the speed bump, the vehicle to adjust a driving operation, of the vehicle, associated with the speed bump.

16. The method of claim 15, wherein the driving information is associated with a distance between the vehicle and a position of the speed bump, and wherein the driving information comprises at least one of vehicle speed information, braking information, or acceleration information, or any combination thereof.

17. The method of claim 15, wherein the detecting of the real type of the speed bump comprises:

detecting, by the controller, the type of the speed bump as a first type of speed bump based on a first peak of the plurality of peaks exceeding a first reference value and a second peak of the plurality of peaks not exceeding a second reference value;

detecting, by the controller, the type of the speed bump as a second type of speed bump based on the first peak exceeding the first reference value and the second peak exceeding the second reference value; or detecting, by the controller, the type of the speed bump as a third type of speed bump based on the first peak not exceeding the first reference value and the second peak not exceeding the second reference value.

18. The method of claim 15, wherein the determining of the type of the speed bump comprises at least one of:

determining, by the controller, the type of the speed bump at a reference point at which a distance to the speed bump is a preset distance;

determining, by the controller, the type of the speed bump at a time point in which the vehicle reaches the speed bump; or determining, by the controller, the type of the speed bump based on an acceleration time point at which the vehicle is accelerated.

19. The method of claim 18, wherein the determining of the type of the speed bump further comprises:

determining, by the controller, the type of the speed bump based on braking of the vehicle, wherein the braking of the vehicle is after passing through the reference point and before the vehicle reaching the speed bump.

20. The method of claim 19, wherein the determining of the type of the speed bump based on the braking comprises:

determining, by the controller, the type of the speed bump as a third type of speed bump based on a brake amount being equal to or being less than a preset brake amount;

determining, by the controller, the type of the speed bump as a first type of speed bump based on the brake amount exceeding the preset brake amount and a braking point being a first braking point; or determining, by the controller, the type of the speed bump as a second type of speed bump based on the brake amount exceeding the preset brake amount and the braking point being a second braking point.

* * * * *